United States Patent [19]

Cole

[11] Patent Number: 5,519,175
[45] Date of Patent: May 21, 1996

[54] ELECTRICAL DISTRIBUTION EQUIPMENT

[75] Inventor: Anthony R. Cole, Swindon, United Kingdom

[73] Assignee: Square D Company, Palatine, Ill.

[21] Appl. No.: 129,115

[22] PCT Filed: Feb. 3, 1993

[86] PCT No.: PCT/US93/00955

§ 371 Date: Oct. 6, 1993

§ 102(e) Date: Oct. 6, 1993

[87] PCT Pub. No.: WO93/16515

PCT Pub. Date: Aug. 19, 1993

[30] Foreign Application Priority Data

Feb. 7, 1992 [GB] United Kingdom ............. 9202557

[51] Int. Cl.[6] .................................................. H01B 17/00
[52] U.S. Cl. ................. 174/149 B; 361/627; 361/658; 361/735
[58] Field of Search ................ 174/149 B, 149 R; 361/823, 824, 644, 611, 627, 628, 637, 648, 649, 650, 657, 658, 652, 629, 735, 744, 716, 634, 639; 439/94, 110, 723

[56] References Cited

U.S. PATENT DOCUMENTS

| | | | |
|---|---|---|---|
| 3,164,752 | 1/1965 | Koenig | 361/648 |
| 4,167,768 | 9/1979 | Baker et al. | 361/638 |
| 4,646,198 | 2/1987 | Rich et al. | 361/627 |
| 4,667,268 | 5/1987 | Mrowka | 361/634 |
| 4,931,898 | 6/1990 | Cole | 361/648 |
| 4,931,902 | 6/1990 | Cole | 361/648 X |
| 4,931,903 | 6/1990 | Cole | 361/645 |
| 4,962,443 | 10/1990 | Cole | 361/658 |
| 5,072,071 | 12/1991 | Cassity et al. | 174/65 R |

*Primary Examiner*—Kristine L. Kincaid
*Assistant Examiner*—Hyung S. Sough
*Attorney, Agent, or Firm*—Larry I. Golden; Kareem M. Irfan; Wayne Stoppelmoor

[57] ABSTRACT

An electrical loadcenter bus bar mounting assembly which has a plurality of juxtaposed synthetic plastics moulded members. Each member is formed to interlock with each next adjacent member and has a plurality of location lugs for engagement with apertures in a support member.

17 Claims, 4 Drawing Sheets

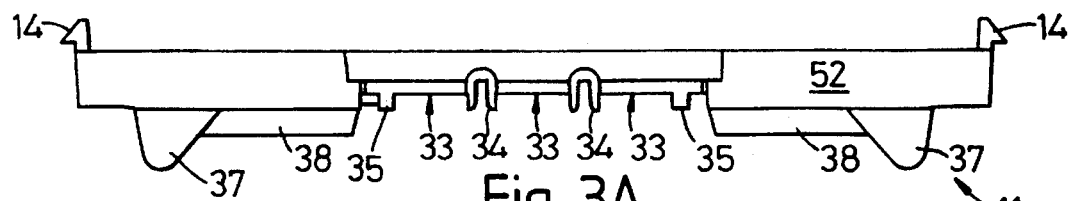
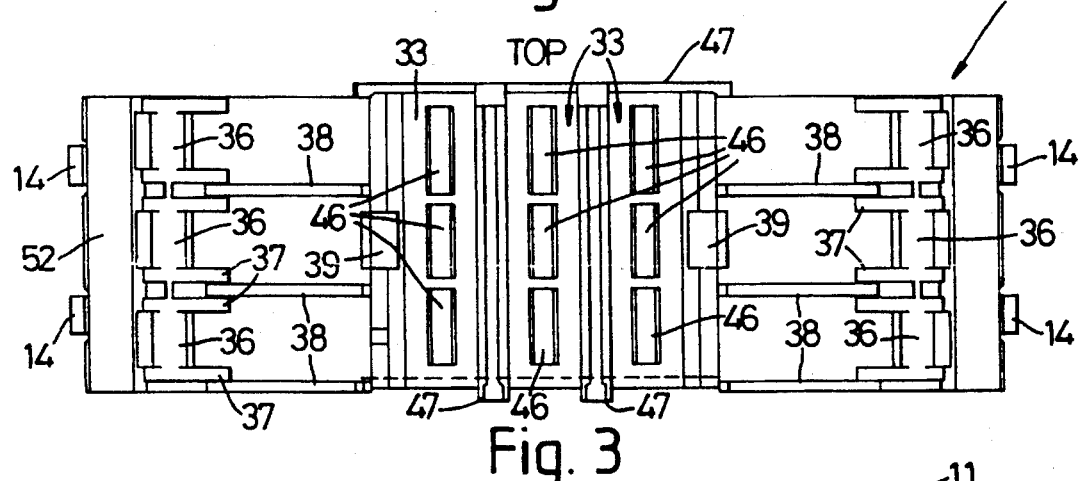
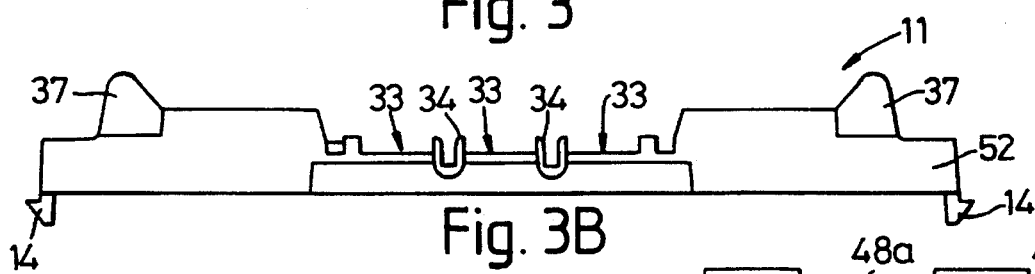
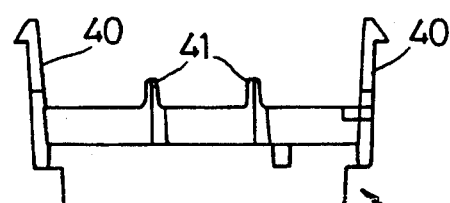
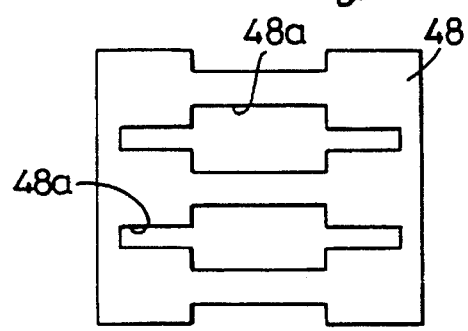
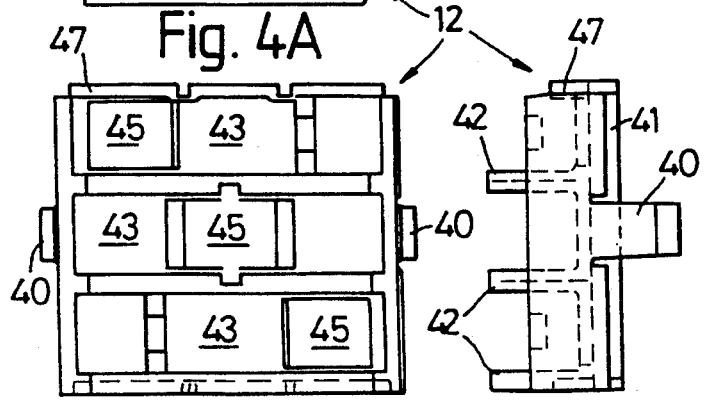
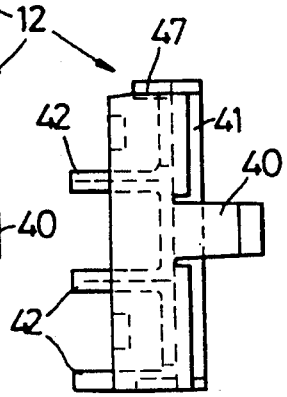
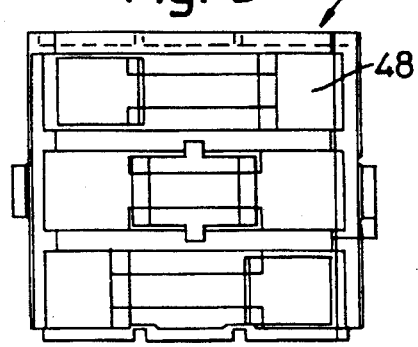

ELECTRICAL DISTRIBUTION EQUIPMENT

The invention relates to electrical distribution equipment and more particularly to electrical loadcentres and parts therefor.

It is an object of the invention to provide a loadcentre bus bar mounting assembly which: is easily variable in capacity; has a reduced number of separate parts; is easily assembled and has many enhanced safety features than heretofore.

According to the invention there is provided an electrical loadcentre bus bar mounting assembly comprising a plurality of juxtaposed synthetic plastics moulded members, each formed so as to interlock with each next adjacent member and each formed with a plurality of location lugs for engagement with apertures in a support member, in use.

Said plastics moulded members may include a first member comprising a single incoming base module formed to accommodate a neutral bus bar transversely in a channel thereacross and locating beneath portions projecting over one side of the channel.

The base module may be formed to accommodate up to four terminal bars connected to the neutral bus bar, secured to the base module and arranged to lock the neutral bus bar in position in said channel. The base module may be formed to accommodate and support terminal input ends of three longitudinally extending output bus bars within separate channels therefor. The base module may also be formed to accommodate and support a safety cover member to span intermediate portions of all of said terminal input ends of said output bus bars.

Said moulded plastics members may also include at least one pair of second and third members, the or each second member comprising a way module formed along one edge thereof with projection means for engaging with slot means formed along an abutting edge of the base module or of the corresponding opposed edge of a juxtaposed further way module and formed with three spaced apart channel portions extending between said opposed edges locating an output bus bar in each thereof, and the or each third member comprising a way barrier formed to locate over its corresponding way module so as to enclose the outgoing bus bars and formed with channels to accommodate separate output terminals for each of the output bus bars.

The channel portions for accommodating the output bus bars in the way module may each be formed with further channel portions therein located to be beneath the output terminal receiving channels of the way barrier. The or each way module may be formed with six solid cylindrical mounting portions each located between upstanding flanges for accommodating mounting of an electrical device to be connected to one of said output terminals. The or each way module may be formed with apertures therethrough which allow passage of location lugs formed on the corresponding way barrier for engagement with apertures in the support surface, in use.

A safety blanking device may be located over the or each way barrier to blank access to said output terminals and the safety blanking device may comprise a member of self-adhesive synthetic plastics material.

The plastics moulded members may include a fourth member comprising a capping member formed to locate with said opposed (free) edge of the way module most remote from the incoming base module.

The foregoing and further features of the invention may be more readily understood from the following description of a preferred embodiment thereof, by way of example, with reference to the accompanying drawings, in which.

Figure 1:
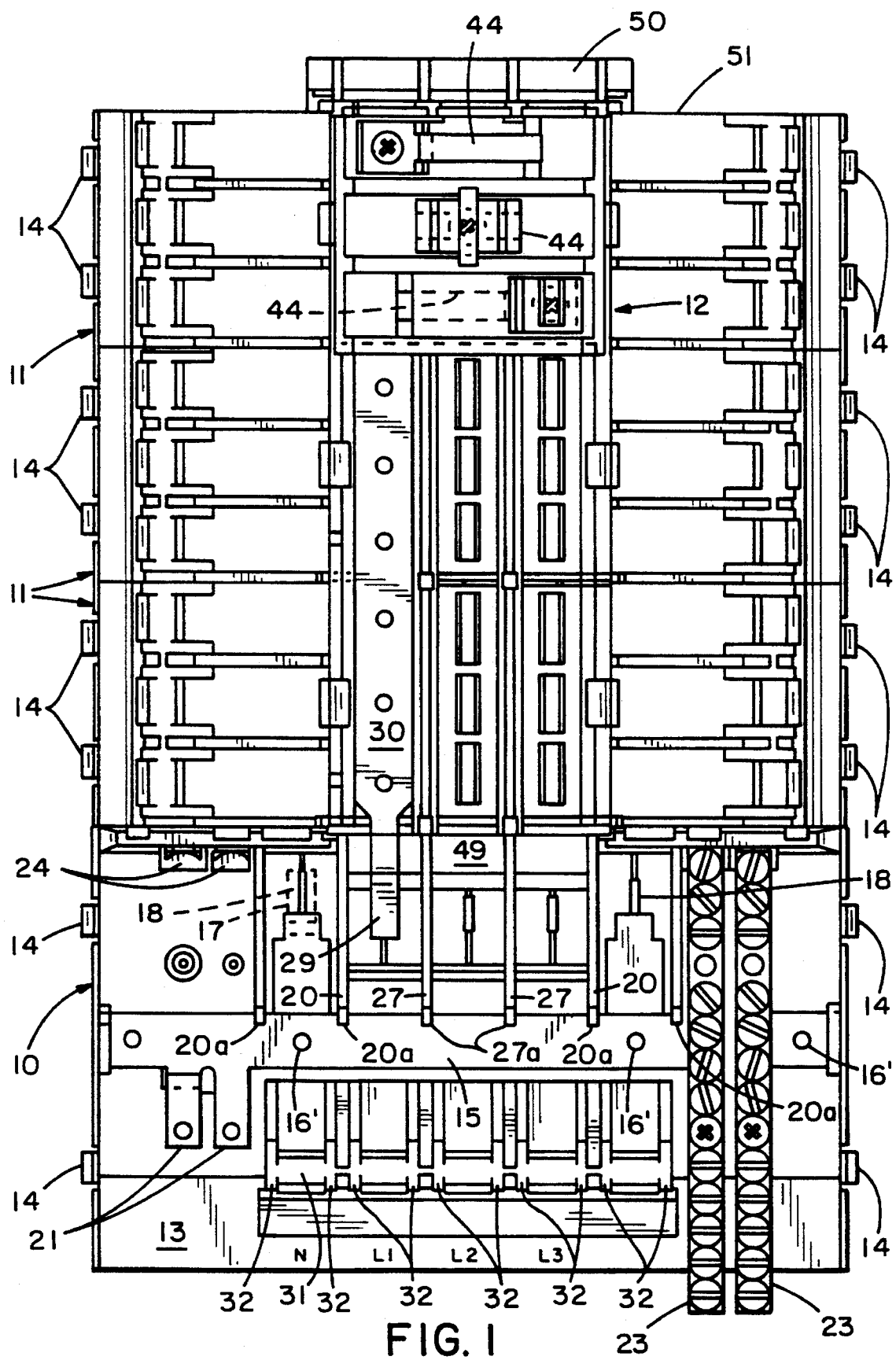
FIG. 1 is a plan view of an electrical loadcentre bus bar mounting assembly.
Figure 7:
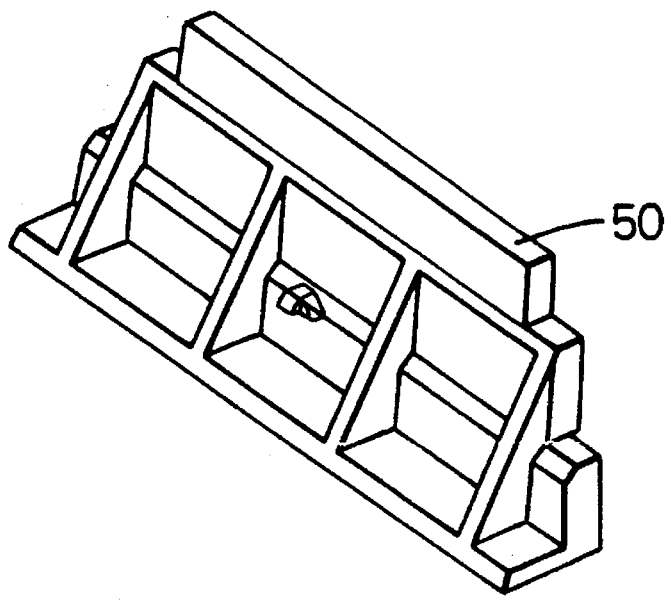
Figure 8:
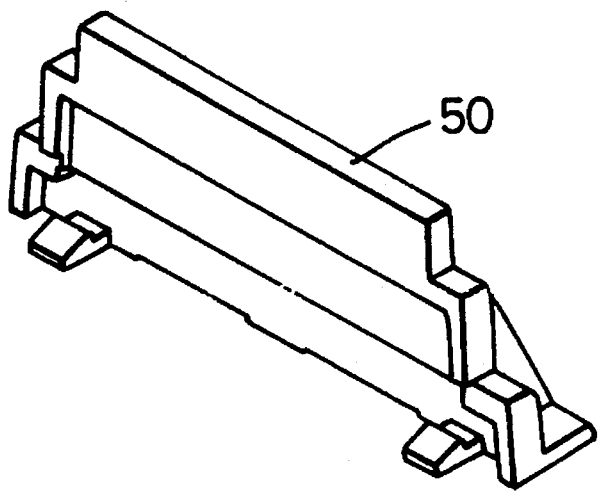

FIGS. 3, 3a, and 3b are plan and opposed side elevational views respectively of a way module of FIG. 1;

FIGS. 4, 4a and 4b are plan and adjacent side elevational views respectively of a way barrier of FIG. 1;

FIG. 5 is a plan view of a safety blanking device for use with the way barrier of FIG. 4;

FIG. 6 is a plan view of a way barrier of FIG. 4 with a blanking device of FIG. 5 located thereon, and FIGS. 7 and 8 are perspective views of a capping member for use with the assembly of FIG. 1.

Referring now to FIG. 1 of the drawings there is shown an electrical loadcentre mounting assembly comprising a plurality of juxtaposed, interlocked moulded synthetic plastics members, comprising a first member in the form of an incoming base module 10, three second members in the form of way modules 11 and three third members (one only shown) in the form of way barriers 12.

Figure 2A:
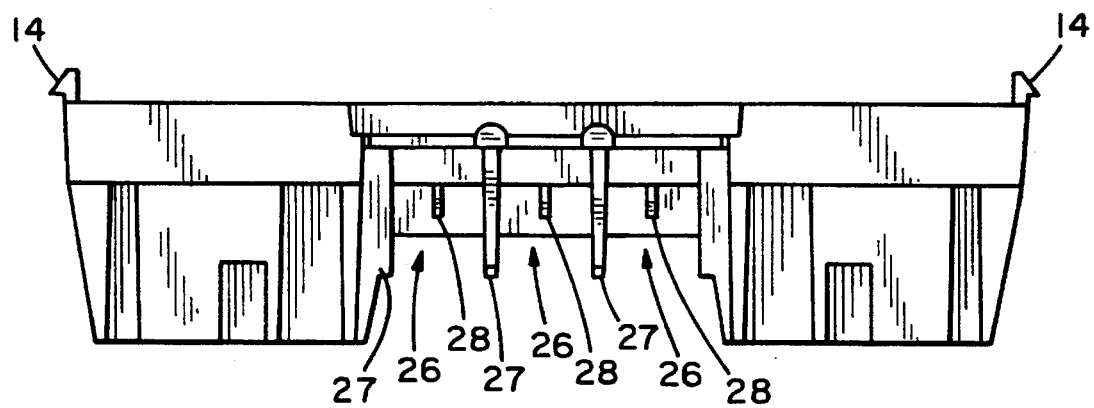
FIGS. 2, 2a and 2b are plan and opposed side elevation views respectively, of the incoming base module of FIG. 1.
Figure 2:
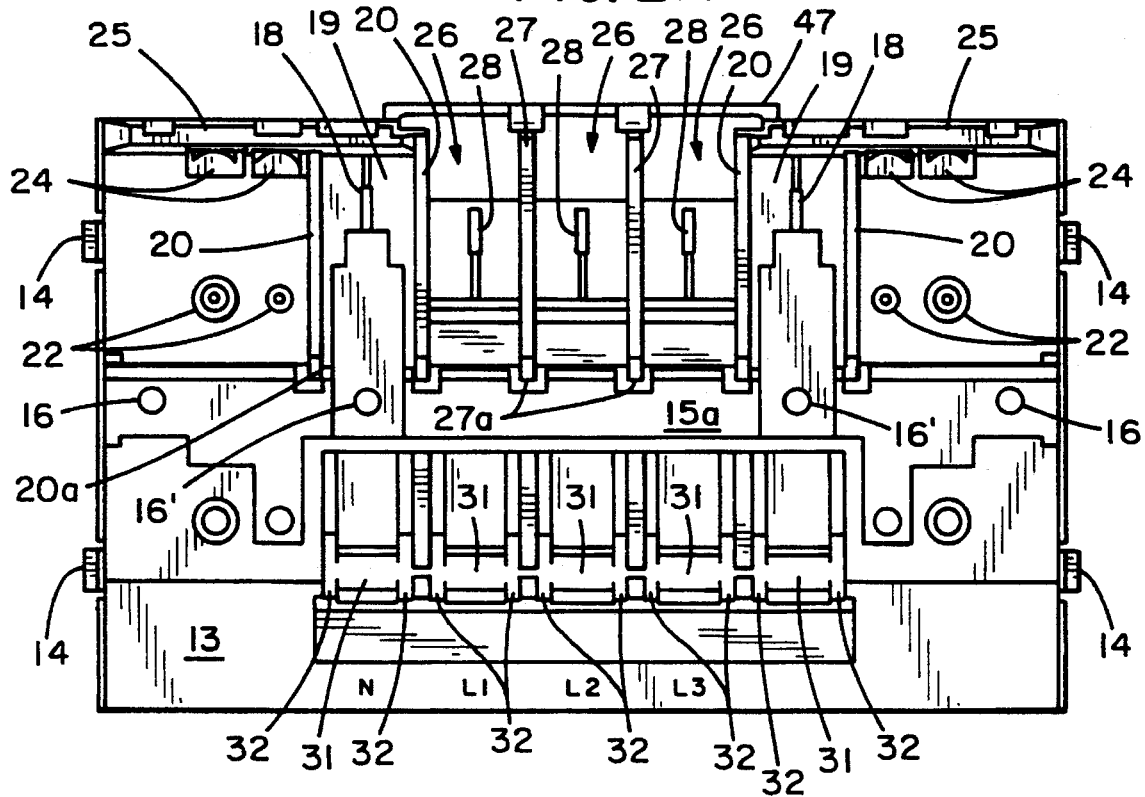
Figure 2B:
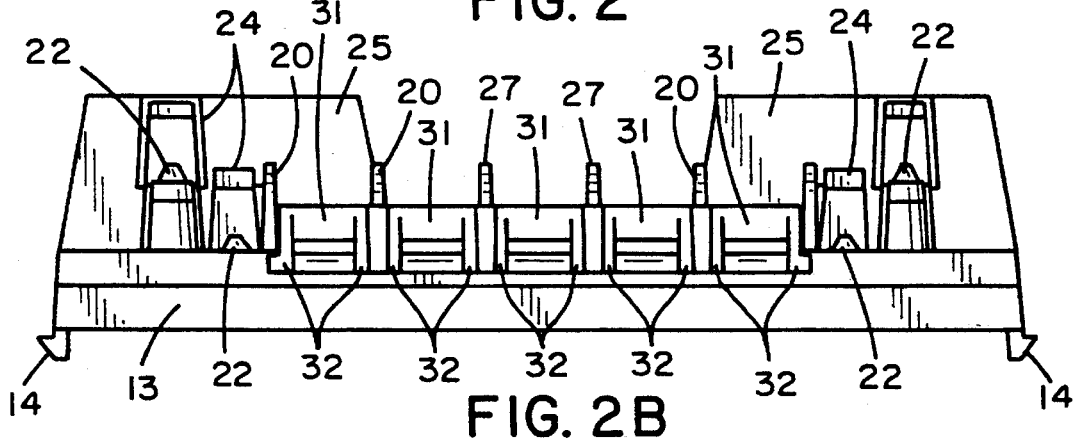

Referring now to FIG. 1 in combination with FIGS. 2, 2a and 2b the incoming base module 10 is formed as a base plate 13 with location lugs 14 depending downwardly therefrom to engage with apertures in a support surface (not shown) which would normally be in the form of the base of a metal box housing. A neutral bus bar 15 (FIG. 1) is located transversely across a channel 15a in the base module 10. The bus bar 15 locates beneath extension portions 20a and 27a of webs 20 and 27. Screw fixing at apertures 16 provides extra security. An input terminal 17 is attached to bus bar 15 at the mid fixing point 16' and a stepped portion of such terminal extends over an upstanding support web 18 within a channel 19 formed by the walls of two upstanding webs 20. A similar arrangement of fixing point 16', web 18, channel 19 and walls 20 is also provided symmetrically at the other side of the module 10. The bus bar 15 may be provided with lugs 21 which overlie fixing points 22 to accommodate terminal bars 23 located at the lugs 21 and within location formations 24 in an upstanding wall 25 of module 10. At least one terminal bar 23 is provided and the fixing to lugs 21 locks the neutral bus bar in position.

Three channels 26 are provided between upstanding webs 27 and are each formed with an upstanding support web 28 for supporting the input terminal ends 29 of output bus bars 30 (FIG. 1). Solid cylindrical portions 31 are located between upstanding webs 32 of base module 10 for locating, a four-way input device between portions 31, on the one hand, and the input terminal 17 and terminal ends 29, on the other hand.

Referring now to FIG. 1 in combination with FIGS. 3, 3a and 3b each way module 11 is formed with three channels 33, the centre channel 33 having upstanding U-shaped channels 34 along each side thereof and the outer sides of outer channels 33 having upstanding webs 35 therealong. Arranged symmetrically on each side of channels 33 are three solid cylindrical portions 36 carried between upstanding webs 37 with wall webs 38 extending to adjacent outer channels 33. Downwardly extending location lugs 14 are also integrally formed with base portion 38. Rectangular apertures 39 are symmetrically located centrally of webs 35.

Referring now to FIGS. 4, 4a and 4b there is shown a way barrier 12 for locating over a way module 11 when output bus bars 30 are located in channels, 33 thereof. To locate barrier 12, downwardly depending legged lugs 40 locate through apertures 39 in way module 11 and locate in location apertures in the support surface and downwardly depending ribs 41 engage in respective U-shaped channels 34 of way module 11. Upstanding webs 42 provide three channels 43 for the location of output terminals 44 for the output bus bars 30 for connection with electrical devices, such as circuit breakers, located between such terminals 44 and cylindrical portions 36. Apertures 45 are formed in barrier 12 to enable connection of terminals 44 with respective bus bars 30.

The channels 33 in way modules 11 have well portions 46 formed therein beneath the areas above which the electrical devices will connect with terminals 44. Terminal 44, connecting and fixing screws enter well portions 46 and centralize output busbar 30 horizontally in channels 33.

Each of the members 10, 11 and 12 have corresponding interengaging formations 47 formed along their opposed edges such that they interlock when located together on a support surface, with lugs 14 and 40 being a snap fit in location apertures in such support surface.

Referring now to FIG. 5 there is shown a safety blanking member 48 which is preferable formed of self-adhesive synthetic plastics material which is formed with apertures 48a to enable location over a way barrier 12, as shown in FIG. 6 so as to cover the terminals 44 when not required. Furthermore a safety blanking strip 49 (FIG. 1) is located on incoming base module 10 so as to cover the intermediate portions of terminals 29 of bus bars 30.

FIGS. 7 and 8 show a capping member 50 which is formed to locate and lock with the outermost free edge 51 (FIG. 1) so that when the assembly is in use in a loadcentre box housing and is wall mounted, no foreign matter can enter the assembly from above.

During assembly within a loadcentre housing the incoming module 10 is firstly snapped into the back of the housing with location lugs 14 entering location apertures within the housing. The required number of way modules 11 are then snapped into the housing, working upwardly from module 10. The neutral bus bar 15, required number of terminal bars 23 and output bus bars 30 are then locationed into position. The way barriers 12 are then located above the way modules 11 and the output terminals 44 are then located above the way barriers by the way moulding well 46 together with the apertures and cavities in way barrier 12 and secured by screw fixings to the bus bars 30. Blanking members 48 and 49 can then be located in position as previously described.

With the arrangement as shown it has been found that the number piece parts for a loadcentre can be reduced by the order of 50% and by having a snap-in mounting arrangement assembly time is considerably reduced. By having the output bus bars 30 almost totally enclosed and supported along the whole of their length, they can be provided of lesser material and can be located more closely adjacent than heretofore which also allows a reduction in the length of the output terminals, thus providing a considerable saving, i.e. in the order of 50%, of material required.

I claim:

1. An electrical loadcentre bus bar mounting assembly comprising:

a plurality of juxtaposed synthetic plastics moulded members, each formed so as to interlock with each next adjacent member and including a plurality of location lugs for engagement with apertures in a support member;

said plastics moulded members including a first member comprising a single incoming base module formed to accommodate a neutral bus bar transversely in a channel formed across said base-module and located beneath portions projecting over one side of the channel;

said plastics moulded members also including at least one pair of second and third members, each second member comprising a way module formed along one edge thereof with projection means for engaging with slot means formed along an abutting edge of the base module or the corresponding opposed edge of a juxtaposed further way module and formed with three spaced apart channel portions extending between said opposed edges for locating an output bus bar in each said channel portion, and each third member comprising a way barrier formed to locate over its corresponding way module so as to enclose the outgoing bus bars and each said third member being formed with channels to accommodate separate output terminals for each of the output bus bars;

a safety blanking device located over each way barrier to blank access to said output terminals, said blanking device comprising a member made of self-adhesive synthetic plastics material.

2. A loadcentre mounting assembly as claimed in claim 1 wherein said base module is formed to accommodate up to four terminal bars connected to the neutral bus bar, secured to the base module and arranged to lock the neutral bus bar in position in said channel.

3. A loadcentre mounting assembly as claimed in claim 2 wherein said base module is formed to accommodate and support terminal input ends of said three longitudinally extending output bus bars within separate channels therefor.

4. A loadcentre mounting assembly as claimed in claim 3 wherein said base module is formed to accommodate and support a safety cover member to span intermediate portions of all of said terminal input ends of said output bus bars.

5. A loadcentre mounting assembly as claimed in claim 1 wherein said base module is formed to accommodate and support terminal input ends of said three longitudinally extending output bus bars within separate channels therefor.

6. A loadcentre mounting assembly as claimed in claim 5 wherein said base module is formed to accommodate and support a safety cover member to span intermediate portions of all of said terminal input ends of said output bus bars.

7. A loadcentre mounting assembly as claimed in claim 1 wherein the channel portions for accommodating the output bus bars in the way module are each formed with further channel portions therein located to be beneath the output terminal receiving channels of the way barrier.

8. A loadcentre mounting assembly as claimed in claim 7 wherein each way module is formed with six solid cylindrical mounting portions each located between upstanding flanges for accommodating mounting of an electrical device to be connected to one of said output terminals.

9. A loadcentre mounting assembly as claimed in claim 8 wherein each way module is formed with apertures therethrough which allow passage of location lugs formed on the corresponding way barrier for engagement with apertures in the support member.

10. A loadcentre mounting assembly as claimed in claim 7 wherein each way module is formed with apertures therethrough which allow passage of location lugs formed on the corresponding way barrier for engagement with apertures in the support member.

11. A loadcentre mounting assembly as claimed in claim 7 wherein said plastics moulded members include a fourth member comprising a capping member formed to locate with said opposed edge of the way module most remote from the incoming base module.

12. A loadcentre mounting assembly as claimed in claim 1 wherein each way module is formed with six solid cylindrical mounting portions each located between upstanding flanges for accommodating mounting of an electrical device to be connected to one of said output terminals.

13. A loadcentre mounting assembly as claimed in claim 12 wherein each way module is formed with apertures therethrough which allow passage of location lugs formed on the corresponding way barrier for engagement with apertures in the support member.

14. A loadcentre mounting assembly as claimed in claim 12 wherein said plastics moulded members include a fourth member comprising a capping member formed to locate with said opposed edge of the way module most remote from the incoming base module.

15. A loadcentre mounting assembly as claimed in claim 1 wherein each way module is formed with apertures therethrough which allow passage of location lugs formed on the corresponding way barrier for engagement with apertures in the support member in use.

16. A loadcentre mounting assembly as claimed in claim 15 wherein said plastics moulded members include a fourth member comprising a capping member formed to locate with said opposed edge of the way module most remote from the incoming base module.

17. A loadcentre as claimed in claim 1 wherein said plastics moulded members include a fourth member comprising a capping member formed to locate with said opposed (free) edge of the way module most remote from the incoming base module.

* * * * *